Oct. 30, 1934.  H. B. MARIS  1,978,434

OPTICAL APPARATUS FOR MEASURING THE THICKNESS OF PIEZO ELECTRIC CRYSTALS

Filed June 13, 1931

INVENTOR
Harry B. Maris
BY
ATTORNEY

Patented Oct. 30, 1934

1,978,434

UNITED STATES PATENT OFFICE 1,978,434

OPTICAL APPARATUS FOR MEASURING THE THICKNESS OF PIEZO ELECTRIC CRYSTALS

Harry B. Maris, Washington, D. C.

Application June 13, 1931, Serial No. 544,216

4 Claims. (Cl. 88—14)

(Granted under the act of March 3, 1883, as amended April 30, 1928; 370 O. G. 757)

This invention relates broadly to apparatus for measuring the thickness of crystals and particularly to an optical apparatus for measuring the thickness of piezo electric crystals.

The principal object of this invention is to provide an accurate and rapid means for measuring the thickness of quartz crystals.

Another object of this invention is to provide a means for detecting flaws in quartz crystals.

Another object of this invention is to provide a means for determining whether or not a quartz crystal is of substantially constant thickness throughout.

Other and further objects of this invention will appear more fully hereinafter as the description is developed.

This invention consists substantially in the construction, combination and arrangement of parts associated therewith or as will be more fully set forth as shown by the accompanying drawing forming a part of this specification and finally pointed out in the appended claims.

Figure 1:
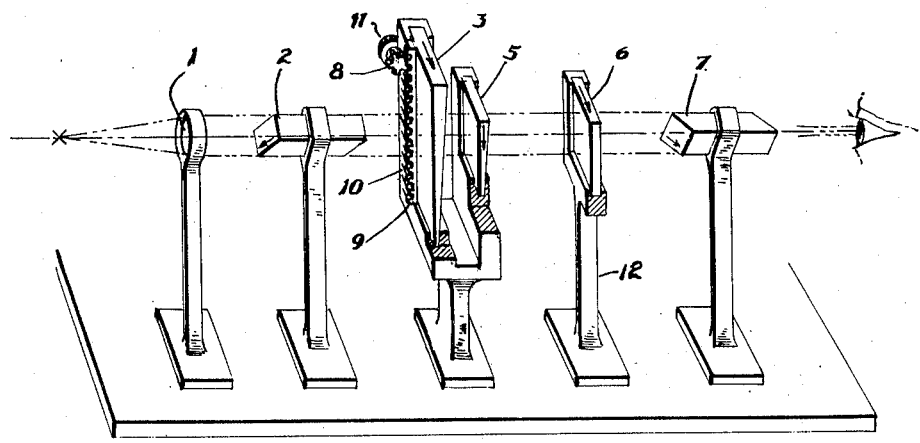
Figure 2:
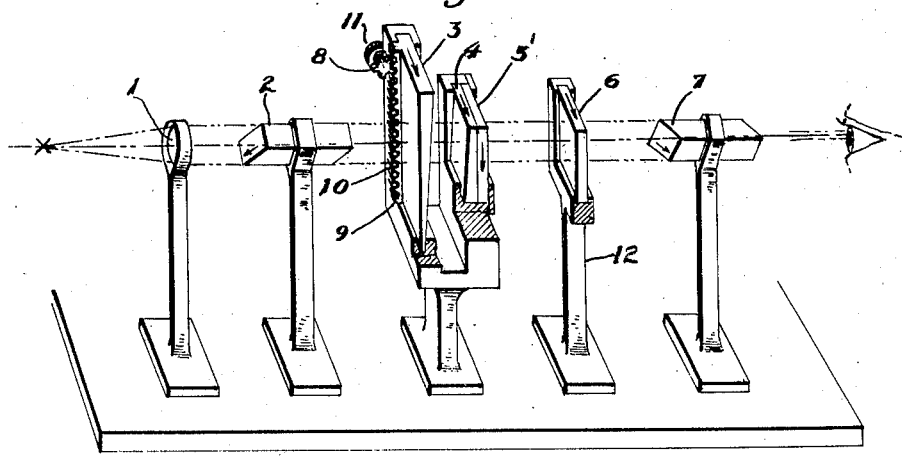

Reference is to be had to the accompanying drawing forming a part of the specification in which like reference characters indicate corresponding parts throughout the two views in which Figure 1 is a perspective view, partly in section of one form of the invention;

Figure 2 is a similar view of a modification thereof.

Quartz crystals used as piezo electric oscillators are cut in thin plates in such a way that the optical axis or the trigonal vertical crystallographic axis of the crystal is in the plane of the surface of the plate. Hence, light passing through a plate normal to the surface is transmitted as two plane-polarized beams which vibrate parallel and perpendicular to the optical axis. The retardation of the perpendicular beam with reference to the parallel beam is in the ratio of 1/170.7 for the Na (sodium) .5893 line. Since the wave length (λ) of this line in quartz is .00003794 centimeters, there is a retardation of one wave length for each thickness of .00648 centimeters. A quartz compensator and crossed Nicol prisms can balance out this retardation with an accuracy of .01 (λ), a difference which is produced by a thickness of .0000648 centimeters of quartz. In some cases, it is desirable that a piezo electric crystal should be planed parallel to within approximately .0002 centimeters. With a suitably constructed quartz wedge compensator, this retardation can be balanced out, giving a much more convenient and accurate measurement of the thickness of the crystal than could be obtained with micrometers. This method of measurement is much more rapid than the use of micrometers in that it permits of the simultaneous measurement of the thickness of the crystal at all points as this measurement presents to the eye a picture of the thick or thin spots over the entire surface of the crystal at a glance.

Referring to Figure 1 in the drawing, X is a source of light. Numeral 1 is a lens for forming a parallel bundle of rays. Numeral 2 is a Nicol prism or any similar device that will pass a plane-polarized beam of light. Numeral 3 is one of the double refraction compensating wedges. Numeral 5 is a second part of the compensating device. Numeral 6 is a crystal whose thickness is to be measured. Numeral 7 is a second Nicol prism or other type of device adapted to pass light of only one polarity. Numeral 8 is a pinion that engages with rack 9 which is fastened to wedge 3 for moving the said wedge in a vertical direction when the knurled knob 11 is turned. The source of light at X, lens 1, Nicol prisms 2 and 7 are arranged in line and constitute a device similar in many respects to a petrographic attachment for a microscope. The Nicol prisms 2 and 7 are crossed so that in the absence of any intervening bodies no light issuing from source X will be observed through prism 7. The crystal to be measured may be inserted between the Nicol prisms in the holder 12. This crystal with its optical axis perpendicular to the beam of light passing between the Nicol prisms causes a double refraction of the light passing through Nicol prism 2. This double refraction may be compensated for by inserting additional elements comprising a compensating device whose double refraction is of opposite sense to that of the crystal 6. This compensating device is composed of a pair of wedge-shaped crystals 3 and 5. The wedge-shaped crystal 5 is composed of quartz which has been cut so that the optical axis lies in the surface of the crystal perpendicular to a line between the two Nicol prisms and perpendicular to the optical axis of the crystal 6 whose thickness is to be measured. The wedge-shaped crystal 3 is made with the same slope as crystal 5, but its optical axis is perpendicular to the optical axis of crystal 5 and parallel to the optical axis of the crystal 6 whose thickness is to be measured. The two wedges 3 and 5 have the same thickness at their bases and the same slope; therefore, when the bases are in line, there is no relative retardation of the light transmitted. The slope of these wedges in the apparatus illustrated is 80/1; however, this is given merely as an example as obviously these wedges could be made of different slope to suit different circumstances.

In operation, the measurement of the thickness of a crysal is effected as follows: The crystal 6 is inserted in the holder 12. Wedge 3 is then moved up or down by means of the knurled knob 11 and the rack and pinion 8 and 9 until the light through the Nicol prism 7 is fully extinguished. The thickness of the crystal may then be read directly on the scale 10. The movement of the wedge 3 with respect to the scale 10 is the direct measurement of thickness of the crystal. Assuming a slope of 80/1 for the quartz crystals 3 and 5, the crystal 3 would have to be moved through 80 millimeters along the scale 10 to compensate for the double refraction of a crystal 1 millimeter in thickness.

The compensator of Figure 2 is similar to the one shown in Figure 1 except that the wedge 4 is made with its optical axis parallel to the optical axis of wedge 3 and with its thin edge in a direction opposite to the direction of the thin edge of wedge 3. A plane parallel quartz plate 5' is cemented to the small wedge 4 with their optical axes at right angles to each other. The mode of operation of the modification in Figure 2 is the same as the operation of Figure 1, the difference being merely in the arrangement of the compensating elements. With a wedge 3 about four inches long and with a slope of 80/1, plates of about one millimeter in thickness can be measured directly by the compensating change in the thickness of wedge 3. Thicker plates can be measured by inserting with the plate to be measured a second plate of known thickness less than one millimeter difference from the thickness to be measured; the optical axes of the two plates are placed at right angles to each other and the differences in the optical paths of the two plates are balanced as before.

When the plates to be measured do not have an optical polish, the plates may be placed in oil between glass plates and they will then transmit light satisfactory for observation.

In the drawing, the wedge-shaped crystal member 3 is shown with the rack 9 fastened thereto by cement, glue or the like, but this member could be mounted in a frame on which the rack member would be mounted. The position of the elements could be reversed by placing the crystal holder 12 between the compensation wedges and the first polarizing prism 2. Also, different types of light polarizers could be used instead of the Nicol prisms. For example, a series of very thin glass plates placed at the proper angle could be used.

In the two embodiments of the invention as shown, the observation of the crystal has been direct. However, these observations may be made by placing a camera to the right of the Nicol prism 7 and photographing the crystal.

Instead of using a wedge compensator as shown in Figure 2, the thickness of a crystal could be determined by comparing the crystal to be measured with a series of crystals of known thickness until the double refraction of the crystal to be measured was exactly compensated for in which case the thickness of the crystal being measured would be equal to the thickness of the standard with which it was compared. This measurement could be effected by substituting for the compensating wedges in Figure 1 the crystal of known thickness and inserting the crystal to be measured in the holder 12 with its optical axis at right angles to the optical axis of the crystal of known thickness. When the double refraction of the standard exactly equals that of the crystal being measured and the light normally visible through Nicol prism 7 is balanced out, the crystals then have the same thickness. The arrows on the elements 3, 4, 5, 5' and 6 indicate the direction of the optic axis in each.

It will be understood that the above description and accompanying drawing comprehend only the general and preferred embodiment of my invention, and that various changes in construction, proportion and arrangement of parts may be made within the scope of the appended claims, and without sacrificing any of the advantages of my invention.

The herein described invention may be manufactured and used by or for the Government of the United States for governmental purposes without the payment to me of any royalties thereon.

What is claimed is:

1. In combination a source of light, a pair of crossed Nicol prisms in alignment therewith, an optical compensator between said prisms comprising two wedge-shaped crystalline members, the thin edges of which are turned in opposite directions and a crystalline block adjacent to said compensator, the optical axes of said wedge-shaped members being parallel to each other and perpendicular to the optical axis of said crystalline block.

2. In combination a source of light, a pair of crossed Nicol prisms in alignment therewith and an optical compensator between said prisms comprising two wedge-shaped crystalline members, the thin edges of which are turned in the same direction, and means for moving one of said wedge-shaped members with respect to the other to vary the thickness of the combination of the two.

3. In combination a source of light, a pair of crossed Nicol prisms in alignment therewith and an optical compensator between said prisms comprising two wedge-shaped crystalline members, the thin edges of which are turned in the same direction, means for moving one of said wedge-shaped members with respect to the other to vary the thickness of the combination of the two, and a marker associated with the movable wedge for indicating the displacement thereof.

4. In combination, a source of light, means for causing the rays from said source to be made substantially parallel, a pair of crossed light polarizing devices in the line of said rays, and a compensating device to compensate the double refraction of a crystal being measured intermediate of said polarizing devices, said compensating device comprising two wedge-shaped crystals the thin edges of which are turned in the same direction and the optical axes of which are at right angles to each other and at right angles to said rays, means for moving one of said wedge-shaped members with respect to the other to vary the double refraction and means for indicating the extent of movement of said wedge graduated in terms of the thickness of said crystal.

H. B. MARIS.